F. M. SHERMAN.
LAWN MOWER.
APPLICATION FILED MAR. 24, 1920.
1,389,537.
Patented Aug. 30, 1921.
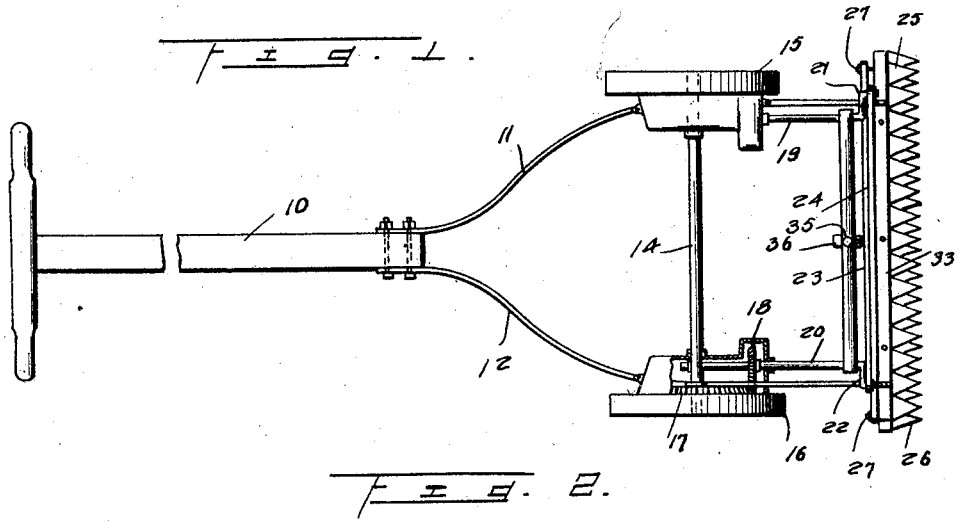
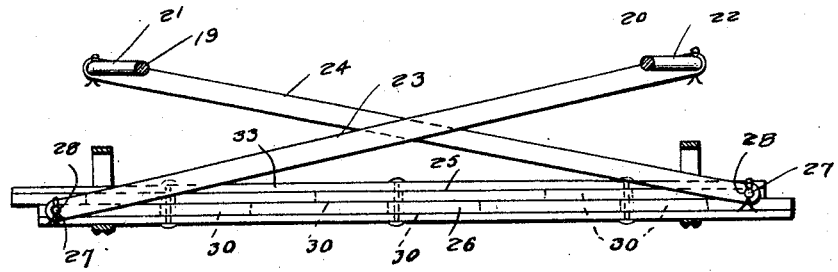
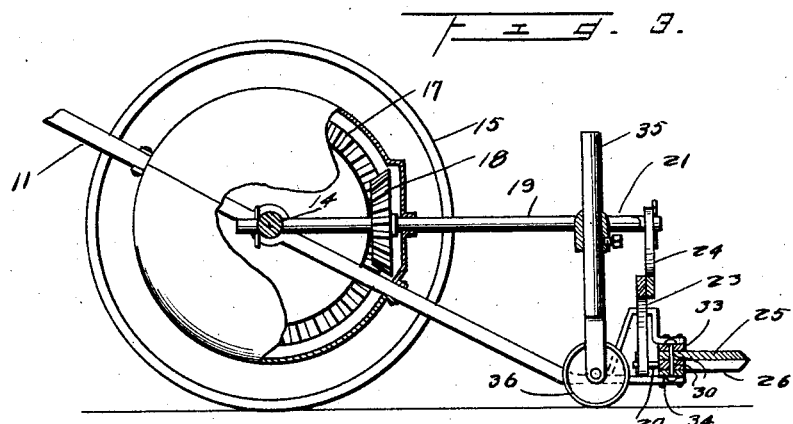
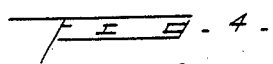
Inventor
F. M. Sherman.

UNITED STATES PATENT OFFICE.

FRANCIS M. SHERMAN, OF LEWISPORT, KENTUCKY.

LAWN-MOWER.

1,389,537. Specification of Letters Patent. Patented Aug. 30, 1921.

Application filed March 24, 1920. Serial No. 368,310.

*To all whom it may concern:*

Be it known that I, FRANCIS M. SHERMAN, a citizen of the United States, residing at Lewisport, in the county of Hancock and State of Kentucky, have invented certain new and useful Improvements in Lawn-Mowers; and I do hereby declare the following to be a full, clear, and exact description of the invention, such as will enable others skilled in the art to which it appertains to make and use the same.

This invention relates to a lawn mower, and one object is to provide a device especially adapted for cutting high grass, and for trimming grass adjacent to trees and bushes, which cannot be readily cut with a mower of the usual type.

A further object is to provide a device of the type indicated which shall be of simple construction, in which any of the elements when worn or broken can be readily replaced, and a device in which the operative elements will not become clogged with cut grass.

With the foregoing and other objects in view, the invention consists in the novel construction, combination, and arrangement of elements hereinafter described and claimed.

In the accompanying drawings:

Figure 1 is a top plan view of the device.

Fig. 2 is a vertical transverse section, looking toward the cutting blades.

Fig. 3 is a vertical section through the machine, transversely of the cutting blades.

Fig. 4 is a detail of construction described below.

In carrying out my invention I employ a handle 10 having connected therewith in the usual manner a bail shaped frame comprising elements 11 and 12, and serving to mount a main axle 14 carrying the ground wheels 15 and 16.

Each of the ground wheels has formed thereon a gear wheel 17 of the bevel type, each wheel meshing with a beveled pinion 18. The pinions 18 are mounted on crank shafts 19 and 20, the crank portions being designated 21 and 22. Each crank element imparts reciprocable movement to a pitman 23 or 24 as the case may be, and these elements in turn impart motion to the reciprocating knives 25 and 26, each knife or blade having a pin 27 on one end engaging an aperture 28 in one of the pitmen. Each blade is provided with slots 30, and the blades are mounted between stationary plates 33 and 34 secured to the lower ends of the elements 11 and 12 of the bail.

The stem 35 of the vertically adjustable gage wheel 36 is suitably mounted, and serves an obvious purpose.

The advantages of the construction have already been outlined, and it may be added that the blades are readily removable for grinding and that the positive cutting action is especially effective in cutting grass of any reasonable height, and for trimming in places difficult of access.

What is claimed is:—

In a lawn mower, a frame comprising side members having spaced elements at their forward ends, the upper elements being arched, spaced upper and lower plates secured to the respective frame elements, knives disposed between the plates and having corresponding slots, fastenings connecting the plates and passing through the slots of the knives, longitudinal shafts having forward cranks, and pitmen connecting the cranks with the respective knives.

In testimony whereof I affix my signature in presence of two witnesses.

FRANCIS M. SHERMAN, M. D.

Witnesses:
Jo. C. PELL,
W. G. HARRELD.